United States Patent [19]

Hirschmann et al.

[11] Patent Number: 5,064,299
[45] Date of Patent: Nov. 12, 1991

[54] OPTOCOUPLER APPARATUS

[75] Inventors: Guenther Hirschmann, Munich; Guenter Waitl; Franz Schellhorn, both of Regensburg, all of Fed. Rep. of Germany

[73] Assignee: Siemens Aktiengesellschaft, Berlin and Munich, Fed. Rep. of Germany

[21] Appl. No.: 318,458

[22] Filed: Mar. 1, 1989

Related U.S. Application Data

[63] Continuation of Ser. No. 58,315, Jun. 5, 1987, abandoned.

[30] Foreign Application Priority Data

Aug. 8, 1986 [DE] Fed. Rep. of Germany ....... 3626826

[51] Int. Cl.$^5$ ............................ G02B 6/36; G02B 7/26
[52] U.S. Cl. ..................................................... 385/33
[58] Field of Search ................ 350/96.18, 96.20, 96.21

[56] References Cited

U.S. PATENT DOCUMENTS 3,663,822  5/1972  Uchida .
4,281,891  8/1981  Shinohara et al. ............... 350/96.18
4,307,934  12/1981  Palmer ............................ 350/96.18
4,440,470  4/1984  Khoe ................................ 350/96.18

FOREIGN PATENT DOCUMENTS 2118113  7/1972  France .

*Primary Examiner*—William L. Sikes
*Assistant Examiner*—Robert E. Wise
*Attorney, Agent, or Firm*—Jeffrey P. Morris

[57] ABSTRACT

An optical connection between an optoelectronic structural element and a fiber-optic beam waveguide is described which is reliable, simple, and space-saving. A lens and a hollow cylinder are integrated in the structural component of optoelectronic structural elements. Each end of a fiber-optic beam waveguide is inserted into the hollow cylinders, and the optoelectronic structural elements are connected with the aid of a heat-shrinkable tubing with the fiber-optic beam waveguide such that the ends of the light beam waveguide to be coupled abut each of the lens integrated into the optoelectronic structural elements. An optocoupler according to the invention may be advantageously used in motor vehicles, in electromedicine, in power electronics, in robot control, in sensory analysis, and in "instrumentation-control-regulation" tasks.

8 Claims, 1 Drawing Sheet

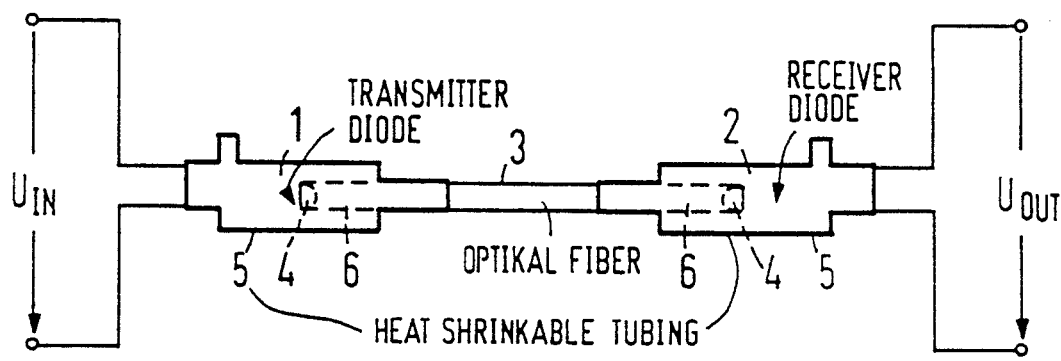

OPTOCOUPLER APPARATUS

CROSS-REFERENCE TO RELATED APPLICATION

This is a continuation of Ser. No. 07/058,315, filed June 5, 1987, now abandoned.

BACKGROUND OF THE INVENTION

1. Field of the Invention

The present invention relates to a novel optic connection and an optocoupler incorporating the optic connection.

2. Description of the Prior Art

High cost and elaborate assembly have, for a long time stood in the way of the advantages of fiber-optic signal transmission compared to wire-bound transmission in the area of communication technology and "instrumentation-control-regulation". Advantages of fiber-optic signal transmission include galvanic separation and protection of the transmission from inductive interference.

The beam waveguide structural components used for optical information transmission and for "instrumentation-control-regulation", which include the fiber-optic transmitter, fiber-optic receiver and beam waveguide, and synthetic beam waveguides, should be simple and reliable to couple with each other, to mechanically fasten with each other, and should be configurable into a reliable fiber-optic connection.

Prior art fiber-optic signal transmission systems with beam waveguides having cost-efficient synthetic fiber-optic light guides as the transmission media, have expensive fastening elements available for the connection between an optoelectronic structural element and the optical fiber. Such fastening elements are expensive and require a great deal of space. Such prior art techniques with fastening elements also require fiber fitting fraught with problems and expenses.

SUMMARY OF THE INVENTION

The present invention is a novel fiber-optic connection and an optocoupler in which a reliable, simple and space-saving optical connection between an optoelectronic structural element and an optical fiber is achieved.

The present invention achieves a reliable mechanical and optical connection between an optoelectronic structural element and the optical fiber by the specific geometry of the optoelectronic fiber-optic structural element in combination with heat-shrinkable tubing, which creates a permanent connection between the optoelectronic structural element and the optical fiber. The specific geometry of the optoelectronic structural element is configured such that in the component part of the optoelectronic structural element, a hollow cylinder and a lens are integrated. For the coupling in a light transmitter or in a light receiver, one end of the optical fiber together with the protective sheathing of the fiber is placed into a hollow cylinder at the upper side of the particular optoelectronic structural element.

Heat-shrinkable tubing may comprise plastic tubing, which contracts permanently upon being heated.

The optical and mechanical connection between the optoelectronic structural element and the optical fiber can only be impaired by destroying the heat-shrinkable tubing. A connection of this kind is thus more reliable than a plug connection.

If an opaque heat-shrinkable tubing is used, the signal-to-noise ratio is improved since ambient light and signal light do not affect each other. Such influence of the ambient light on the signal light is otherwise, in particular in transmitting visible light, difficult to avoid in prior art techniques when the structural form of the optoelectronic structural component includes an integrated hollow cylinder and integrated lens.

Through fastening methods according to the invention, influences of the environment, such as dust and moisture are kept from the connection site.

The coupling losses between the optical fiber and the fiber-optic structural element are minimized through the particular combination of an integrated lens and an integrated hollow cylinder of the optoelectronic fiber-optic structural element, and by the heat-shrinking process of the heat-shrinkable tubing. Optical coupling is only optimal, if the optical fiber abuts the integrated lens of the optoelectronic fiber-optic structural element. Through the process of shrinking, the optical fiber is pulled permanently in the integrated hollow cylinder to the integrated lens of the optoelectronic fiber-optic structural element and abuts it.

The prior art technique of removal of the sheathing of the optical fiber without damage to the transparent fiber-optic core is fraught with problems i.e., possible fiber breaking, and is expensive. For establishing an optical connection according to the invention, removal of the sheathing of the optical fiber is not required.

An object of the present invention is thus to provide an optical connection wherein a super tension optocoupler can be practically realized for optical signal transmission with variably adjustable insulating strength of, for example, greater than 15 kV. Additionally, no disturbing cross-talk between the light transmitter and the light receiver occurs, because the capacitive coupling is negligible For many applications, a simple and cost-effective device for simple optical signal transmission is provided. Bit rates into he Mbit/s range and transmission distances in the range of meters, and fiber-optic structural elements derived from LED housing structural forms for transmitters and for receivers, together with optical fibers, in particular together with plastic fibers, can be accommodated in a transmission system in accordance with the present invention.

An optocoupler according to the invention permits high reliability, a long operating life, low noise, low coupling capacitance, good linearity and short switching times.

An optocoupler according to the invention is also suitable for installation in a motor vehicle, for electromedicine, for power electronics, for robot control, for sensory analysis and for "instrumentation-control-regulation" tasks.

BRIEF DESCRIPTION OF THE DRAWING

The FIGURE shows schematically a beam waveguide optocoupler in accordance with the present invention.

DESCRIPTION OF THE PREFERRED EMBODIMENT

Fiber optic structural elements 1 and 2 are suitable for simple optical signal transmission. These fiber-optic structural elements 1 and 2 are derived from known LED housing forms and have, for example, on the end face a hole 6 of 2.3 mm, into which an optical fiber 3, which may comprise a plastic fiber, can be inserted. The light transmitter 1 consists of infrared diodes or of red or green light emitting diodes (LED). The light receiver 2 consists of photo diodes or of photo transistors. Light transmitter 1 and light receiver 2 can be combined in any desired manner.

In addition to optical data transmission, the individual elements of the optocoupler of the present invention can comprise an optocoupler of a few centimeters to approximately 20 meters coupling length using a plastic fiber for the optical fiber 3. Because of the versatile combination of the different distinct elements of the optocoupler, very short switching times, high insulating voltages and negligible coupling capacitance can be achieved.

Optocouplers serve for level adjustment, for signal processing, and are particularly useful for separating electric potentials. In modern electronics, the optocoupler is an important structural element.

In an optocoupler as described herein, transmission lengths of 20 meters can be realized. The low power transmitted with an optocoupler of this nature allows operation in areas subject to the danger of explosion, since no ignition danger exists. The optocoupler permits interference-free transmission even under conditions of strong variable electromagnetic interference fields. Because of the negligible capacitive coupling between light transmitter 1 and light receiver 2, interruptive cross-talk is not possible. The insulating voltage can have any desired value in an optocoupler according to the invention. Under conditions of high switching frequency, the fiber-optic optocoupler has short switching times. Switching times in the range of nanoseconds are possible.

Operationally, the two diodes 1, 2 are provided in a structural component with a hole 6. The plastic fiber cable 3 must fit well in the holes 6 so that no additional losses occur when light is coupled in. No extraneous light should fall on the fiber-optic structural elements 1, 2, so that as high a system stability as is possible can be achieved These two demands are achieved when the hole 6 in the diodes 1, 2 structural component and the particular end of the plastic fiber cable 3 are fastened in heat-shrinkable tubing 5.

In order for the scattering losses at the ends of the plastic fiber 3 to be low, the surface of the ends should be treated, such as by wet grinding, with fine sand paper (for example, grain size 600).

Suitable plastic fibers 3 for an optocoupler have, for example, an inner diameter of 1 mm and an outer diameter of 2.3 mm.

The specific geometry of the optoelectronic structural elements 1, 2 are such that in the particular structural component of the optoelectronic structural elements 1, 2 one hollow cylinder 6 and one lens 4 are integrated. For coupling the light transmitter 1 and/or the light receiver 2, one end of the optical fiber 3 together with the protective sheathing of the optic fiber 3 (not shown) is inserted into the hollow cylinder 6 at the upper side of the optoelectronic structural element 1,2. In the process of shrinking the heat-shrinkable tubing 5, the optical fiber 3 is pulled permanently in the integrated hollow cylinder 6 to the integrated lens 4 of the optoelectronic fiber-optic structural elements 1,2 and abuts it.

What is claimed is:

1. A component for providing an optical connection for optical signal transmission between a light transmitter and a light receiver in which a light beam waveguide is coupled in the transmission path for light transmission, comprising:

light transmitter means and light receiver means having an integrated lens and an integrated hollow cylinder such that one end of the light beam waveguide is inserted in each respective hollow cylinder and wherein the light transmitter and the light receiver are connected with the light beam waveguide by heat-shrinkable tubing means such that the coupled ends of the light beam waveguide abut the integrated lens in the light transmitter and the integrated lens in the light receiver, and form integral components having a single casing in which said hollow cylinder and said lens are integrated, and wherein there is a direct optical coupling between said lens and the end of said light beam waveguide in said hollow cylinder.

2. A component according to claim 1, wherein the optical fiber is comprised of synthetic material.

3. A component according to claims 1, wherein the heat-shrinkable tubing is opaque.

4. A component according to claim 1 wherein said transmitter includes an LED diode and wherein said receiver includes a photodiode.

5. An optocoupler for optimal signal transmission with a light transmitter and a light receiver in which fiber-optic waveguide is used for light transmission between the light transmitter and the light receiver, comprising:

a light transmitter and a light receiver each including structural components including heat shrinkable tubing means having integrated therein a lens and one hollow cylinder such that each end of the fiber-optic waveguide is inserted into one of the two respective hollow cylinders such that the light transmitter and the light receiver are each connected;

said heat shrinkable tubing means being adapted to receive each end of the fiber-optic waveguide therein to abut a lens integrated into each of said structural components of the light transmitter and the light receiver, such that a single casing is formed having an integrated hollow cylinder and lenses therein, and wherein there is a direct optical coupling between said lens and the end of said light beam waveguide in said hollow cylinder.

6. An optocoupler according to claim 5, wherein the optical fiber is comprised of synthetic material.

7. An optocoupler according to claim 5, wherein the heat-shrinkable tubing is opaque.

8. An optocoupler according to claim 5 wherein said transmitter includes an LED diode and wherein said receiver includes a photodiode.

* * * * *